United States Patent
Singleton et al.

(10) Patent No.: US 8,472,147 B2
(45) Date of Patent: Jun. 25, 2013

(54) MAGNETORESISTIVE SHIELD WITH LATERAL SUB-MAGNETS

(75) Inventors: Eric W. Singleton, Maple Plain, MN (US); Junjie Quan, Bloomington, MN (US); Jae-Young Yi, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 144 days.

(21) Appl. No.: 13/102,751

(22) Filed: May 6, 2011

(65) Prior Publication Data

US 2012/0280774 A1    Nov. 8, 2012

(51) Int. Cl.
G11B 5/39    (2006.01)

(52) U.S. Cl.
USPC ..................... 360/319; 360/324.12

(58) Field of Classification Search
USPC ............................. 360/319, 324.12
See application file for complete search history.

(56) References Cited

U.S. PATENT DOCUMENTS

| | | | |
|---|---|---|---|
| 5,515,221 A | 5/1996 | Gill et al. | |
| 6,018,443 A | 1/2000 | Watanabe et al. | |
| 6,563,679 B1 * | 5/2003 | Li et al. | 360/324 |
| 6,597,546 B2 | 7/2003 | Gill | |
| 6,710,982 B2 | 3/2004 | Mack et al. | |
| 7,236,333 B2 | 6/2007 | Macken | |
| 7,606,007 B2 | 10/2009 | Gill | |
| 2005/0068694 A1 * | 3/2005 | Nakabayashi et al. | 360/324.11 |
| 2006/0209471 A1 * | 9/2006 | Nagasaka et al. | 360/324.1 |
| 2007/0030603 A1 * | 2/2007 | Sato et al. | 360/324 |
| 2009/0279213 A1 | 11/2009 | Wu et al. | |
| 2011/0215800 A1 * | 9/2011 | Zhou et al. | 324/252 |

* cited by examiner

Primary Examiner — Craig A. Renner
(74) Attorney, Agent, or Firm — Hall Estill Attorneys at Law

(57) ABSTRACT

A magnetic shield for a magnetoresistive (MR) reader has one or more lateral hard magnets and a ferromagnetic shielding layer with at least one hard sub-magnet in a lateral notch in the shielding layer. The notch allows the shielding layer to contact the sub-magnet on surfaces along multiple normal planes.

20 Claims, 4 Drawing Sheets

ABS VIEW

MAGNETORESISTIVE SHIELD WITH LATERAL SUB-MAGNETS

SUMMARY

Various embodiments of the present invention are generally directed to a magnetic shield that may be capable of defining a predetermined track width.

In accordance with various embodiments, a magnetic shield for a magnetoresistive (MR) reader has one or more lateral hard magnets and a ferromagnetic shielding layer with at least one hard sub-magnet in a lateral notch in the shielding layer. The notch allows the shielding layer to contact the sub-magnet on surfaces along multiple normal planes.

DETAILED DESCRIPTION

Figure 1:
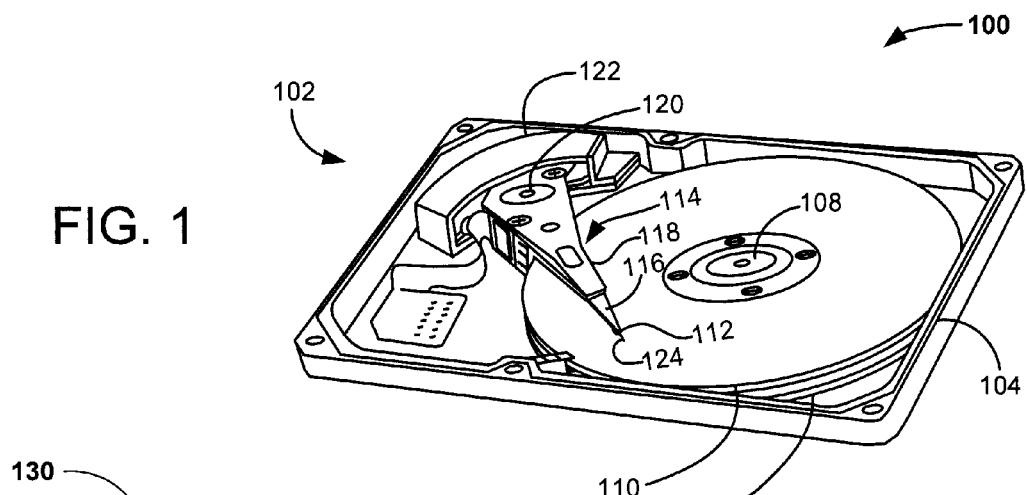
FIG. 1 is a block representation of an embodiment of a data storage device.

The present disclosure generally relates to magnetic shields capable of defining a predetermined track width, such as in the context of reading elements used in data transducing heads. As electronics devices become more sophisticated, demand for higher data capacity has placed added emphasis on the size of data written to a data storage media and the elimination of unwanted magnetic instability. With a higher data capacity often relying on fitting more bits in a given area on a storage media, the ability for a magnetic writing element to precisely program and read ever smaller bits plays an increasingly important role.

Accordingly, various embodiments of the present invention are generally directed to a magnetic shield for a magnetoresistive (MR) reader that has one or more lateral hard magnets and a ferromagnetic shielding layer with at least one hard sub-magnet in a lateral notch in the shielding layer. The notch may allow the shielding layer to contact the sub-magnet on surfaces along multiple normal planes, which can utilize the lateral sub-magnets to pin the magnetization of the shielding layer and improve magnetic shield stability. Such an ability to increase shield stability can consequently enhance magnetic noise cancellation and the accuracy of the MR reader An embodiment of a data storage device 100 is provided in FIG. 1. The device 100 shows a non-limiting environment in which various embodiments of the present invention can be practiced. The device 100 includes a substantially sealed housing 102 formed from a base deck 104. An internally disposed spindle motor 108 is configured to rotate a number of magnetic storage media 110. The media 110 are accessed by a corresponding array of data transducers (read/write heads) that are each supported by a head gimbal assembly (HGA) 112. Each HGA 112 can be supported by a head-stack assembly 114 ("actuator") that includes a flexible suspension 116, which in turn is supported by a rigid actuator arm 118.

The actuator 114 may pivot about a cartridge bearing assembly 120 through application of current to a voice coil motor (VCM) 122. In this way, controlled operation of the VCM 122 causes the transducers 124 of the HGA 112 to align with tracks (not shown) defined on the media surfaces to store data thereto or retrieve data therefrom. An ability to decrease the width of the tracks while maintaining proper alignment of the transducers 124 can be accomplished by decreasing the operational width of at least one transducing magnetic element. Thus, the device 100 can have increased capacity through the incorporation of transducing elements with reduced operational width which corresponds to a finer areal resolution.

Figure 2:
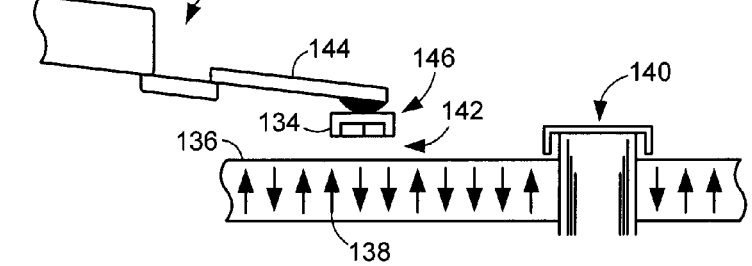
FIG. 2 is a perspective view of a portion of a data storage device in an embodiment.

An embodiment of a data transducing portion 130 of the data storage device 100 provided in FIG. 1 is displayed in FIG. 2. The transducing portion 130 has an actuating assembly 132 that positions a transducing head 134 over a magnetic storage media 136 that is capable of storing programmed bits 138. The storage media 136 is attached to a spindle motor 140 that rotates during use to produce an air bearing surface (ABS) 142 on which a slider portion 144 of the actuating assembly 132 flies to position a head gimbal assembly (HGA) 146, which includes the transducing head 134, over a predetermined portion of the media 136.

The transducing head 134 can include one or more transducing elements, such as a magnetic writer and magnetically responsive reader, which operate to program and read data from the storage media 136, respectively. In this way, controlled motion of the actuating assembly 132 causes the transducers to align with tracks (not shown) defined on the storage media surfaces to write, read, and rewrite data.

Figure 3:
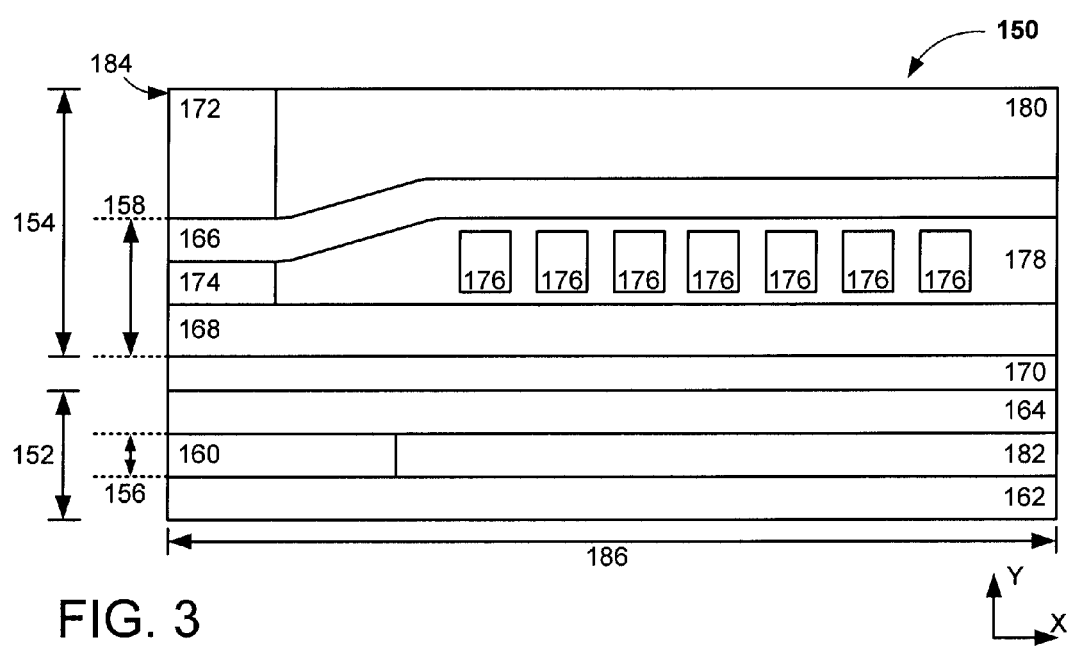
FIG. 3 generally illustrates an embodiment of a magnetic element capable of being used in the portion of the data storage device displayed in FIG. 2.

FIG. 3 displays an embodiment of a cross-sectional block representation of a transducing head 150 that is capable of being used in the actuating assembly of FIG. 2. The head 150 can have one or more magnetic elements, such as the magnetic reader 152 and writer 154, which can operate individually or concurrently to write data to or retrieve data from an adjacent storage media, such as media 136 of FIG. 2. Each magnetic element 152 and 154 is constructed with multiple magnetic shields and transducing elements that independently define a predetermined and separated read and write track 156 and 158.

As displayed, the magnetic reading element 152 has a magnetoresistive layer 160 disposed between leading and trailing shields 162 and 164. Meanwhile, the writing element 154 has a write pole 166 and a return pole 168 that create a writing circuit to impart a predetermined magnetic orientation to the adjacent storage media. The return pole 168 is separated from the read element 152 by a gap layer 170 of non-magnetic material while the write pole 166 is disposed between a trailing shield 172 and an insulating material 174 that maintains separation of the writing and return poles 166 and 168.

The writing element 154 further includes a coil 176 that can be one or many individual wires capable of imparting a magnetic flux on the write pole 166 to travel through the write circuit that concludes at the return pole 168. Additional insulating layers 178, 180, and 182 surround the coil 176, write pole 166, and MR layer 160 to prevent leakage of magnetic flux within the transducing head 150.

The various shields and insulating materials about each magnetic element 152 and 154 provide similar focusing of magnetic fields, but the shields on the ABS 184 are configured to focus magnetic fields within the predetermined tracks 156 and 158. That is, the insulating materials 178 and 180 focus magnetic fields on the write pole 166 while the shields 162, 164, and 172 each prevent the migration of magnetic fields outside the predetermined tracks 156 and 158.

The shields of the transducing head 150 can be characterized by their position with respect to the timing of encountering external bits, such as bits 138 of FIG. 2. In other words, the shields that encounter the external bits before the transducing elements 152 and 154 are "leading" shields while shields that see the bits after the transducing elements are "trailing" shields. Such characterization extends to the difference between "upstream" or "downstream" of the transducing elements in that, depending on the direction of travel for the head 150 and external bits, the shields can be either leading or trailing and either upstream or downstream.

The transducing head 150, and each of the respective layers, has a predetermined thickness measured along a Y plane, and a stripe height 186 measured along an X plane. With respect to the shields 162, 164, and 172, the respective shape and dimensions do not vary along the stripe height 186. As such, each shield maintains a predetermined thickness throughout the extent of each shield's stripe height.

With the track width 158 getting smaller to allow more densely programmed storage media, more precise definition of the track 158 corresponds with a minimized head size. The smaller transducing head 150 consequently is more sensitive to unwanted magnetic fields from adjacent tracks. The reduced head 150 topography can further introduce magnetic instability through magnetic domain movement in the magnetic shields due to narrow shield-to-shield spacing. Accordingly, portions of the shields surrounding the write pole 166 can be configured with magnetic stabilizing features that better focus magnetic flux and more precisely define the track 158.

Figure 4:
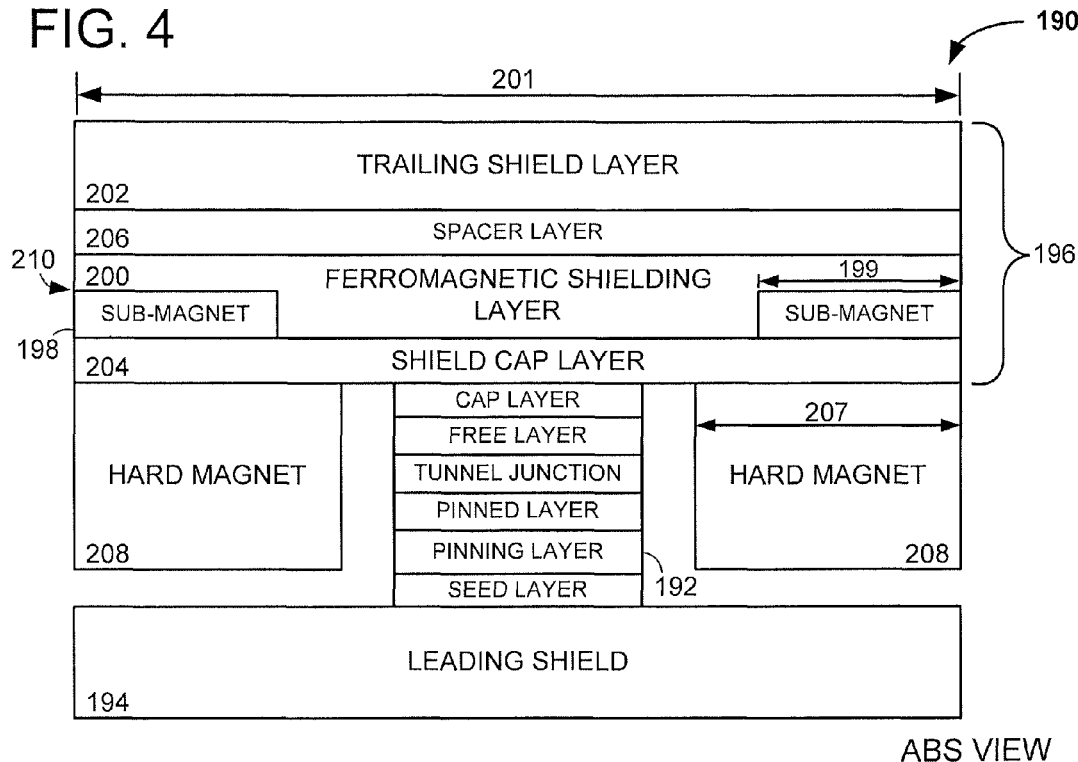
FIG. 4 shows a portion of the magnetic element of FIG. 3 as viewed from the air bearing surface (ABS).

FIG. 4 is a block representation of an embodiment of a portion of a magnetic element 190 is displayed as viewed from the ABS. It is to be understood that FIG. 4 is generally illustrated as aligned with a predetermined track where the bottom portion of the element 190 is uptrack and will encounter a magnetic bit before a downtrack portion at the top of the element 190. As a magnetoresistive (MR) element 192 encounters a rotating magnetic media, leading and trailing shields 194 and 196 protect the MR element 192 from external magnetic flux. As discussed above, the MR element 192 can be susceptible to unwanted magnetic flux that can induce instability and reduced accuracy, which can be alleviated by stabilizing the magnetic domains of at least the trailing shield 196.

Stabilizing the trailing shield 196 can be achieved with the introduction of sub-magnets 198 with a predetermined first width 199 on opposing lateral sides of a ferromagnetic shielding layer 200 that has a predetermined second width 201 is positioned between the MR element 192 and an external trailing shield layer 202. The trailing shield 196 further includes a shield cap layer 204 and a non-magnetic spacer layer 206 that allow the shielding layer 200 to have a predetermined magnetization that is maintained by the sub-magnets 198. Specifically, the shield cap layer 204 decouples the shielding layer 200 from the predetermined third width 207 of each lateral hard magnet 208 that respectively bias portions of the MR element 192 while the spacer layer 206 decouples the shielding layer 200 from the trailing shield layer 202.

The magnetic stability of the trailing shield 196 is enhanced by configuring a notch 210 on opposing lateral sides of the shielding layer 200, which allows the sub-magnets 198 to be nested within the areal extent of the shielding layer 200 without adding to the shield-to-shield spacing of the magnetic element 190. The notches 210 each increase the coupling of the sub-magnets 198 to the shielding layer 200 by contacting multiple normal surfaces of shielding layer 200. That is, the sub-magnets 198 each contact the shielding layer 200 along perpendicular surfaces, which provides a greater surface area for magnetic coupling and more stable magnetization in the shielding layer 200.

However, the trailing shield 196 is not limited to the configuration shown in FIG. 4 and can be oriented, in various embodiments, with a variety of different materials, layers, and configurations that promote magnetic stability through reduced magnetic domain movement. Furthermore, the configuration of the trailing shield 196 that enhances magnetic stability can be implemented in other shields, such as leading shield 194.

Figure 5:
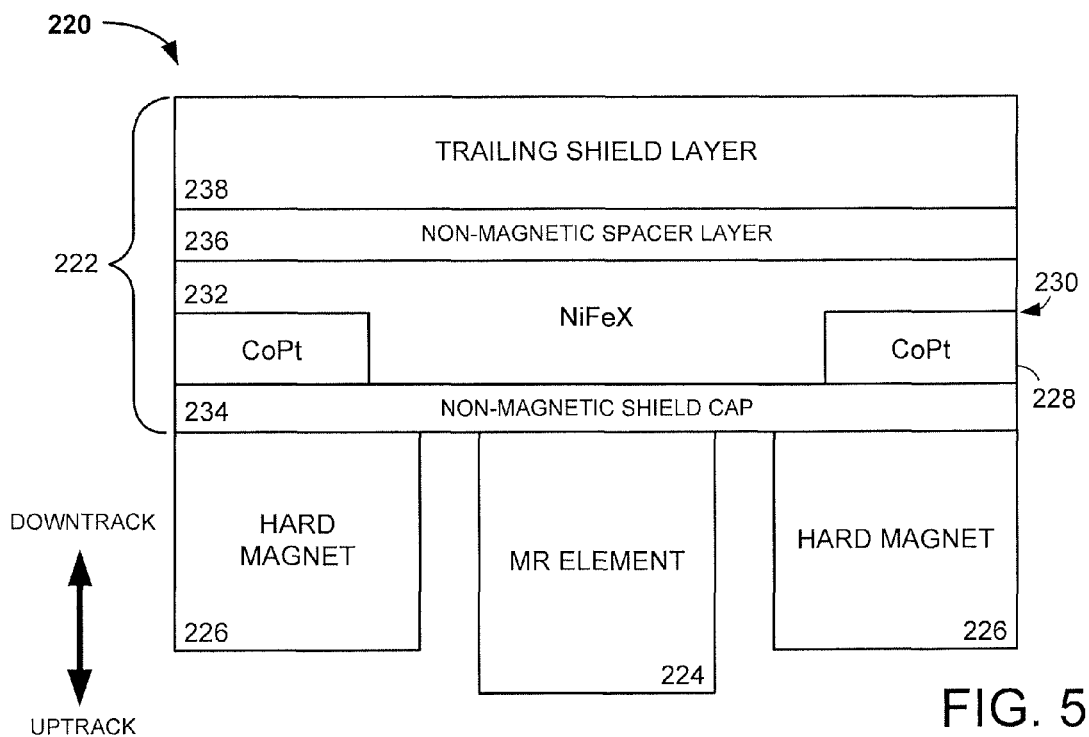
FIG. 5 illustrates an embodiment of a portion of a shield configuration capable of being used in the magnetic element of FIG. 3.

An embodiment of a portion of one such embodiment is displayed in FIG. 5 in which a magnetic element 220 has a trailing shield 222 attached to an MR element 224 that is set to a default magnetization via proximity to lateral hard magnets 226 that can be constructed as either a single material, such as CoPt and FePt, or as a lamination of layers, such as alternating Pt and Fe, which exhibits high magnetic coercivity.

While the lateral hard magnets 226 operate to magnetically bias some or all of the MR element 224, the trailing shield can similarly have sub-magnets 228 oriented in predetermined notches 230 that allow magnetic coupling through contact with perpendicular internal surfaces of the shielding layer 232 constructed of soft magnetic materials, such as NiFeX alloy. In various embodiments, the NiFeX magnetic material may be made of, but not limited to, NiFe, NiFeNb, NiFeTa, NiFeRh or NiFeW. The magnetic coupling between the sub-magnets 228 and the shielding layer 232 sets and maintains a predetermined magnetization in the shielding layer 232 that allows the trailing shield 222 to protect the MR element 224 from unwanted magnetic flux by minimizing magnetic domain movement in the shield 222.

The magnetization of the shielding layer 232 is further maintained by the non-magnetic shield cap 234 and spacer layer 236 that decouple the shielding layer 232 from the hard magnets 226, MR element 224, and trailing shield layer 238, respectively. The decoupling of the shield cap 234 and spacer layer 236 can be modified with varying thickness to provide more or less magnetic isolation of the shielding layer 232. The trailing shield layer 238 can operate in conjunction with the pinned shielding layer 232 to protect the MR element from distal magnetic flux. The trailing shield layer 238 can be constructed as a single material or, in some embodiments, as a pinned ferromagnetic layer much like the shielding layer 232.

The added control of magnetic domain movement in the trailing shield 222 allows the magnetic element 220 to have a reduced size while maintaining high data reading accuracy. The use of highly coercive lateral sub-magnets 228 to pin the magnetization of the shielding layer 232 from the outer lateral surfaces of the magnetic element 220 allows the trailing shield 222 to have a minimal vertical height with enhanced flux defense for the MR element 224.

Figure 6:
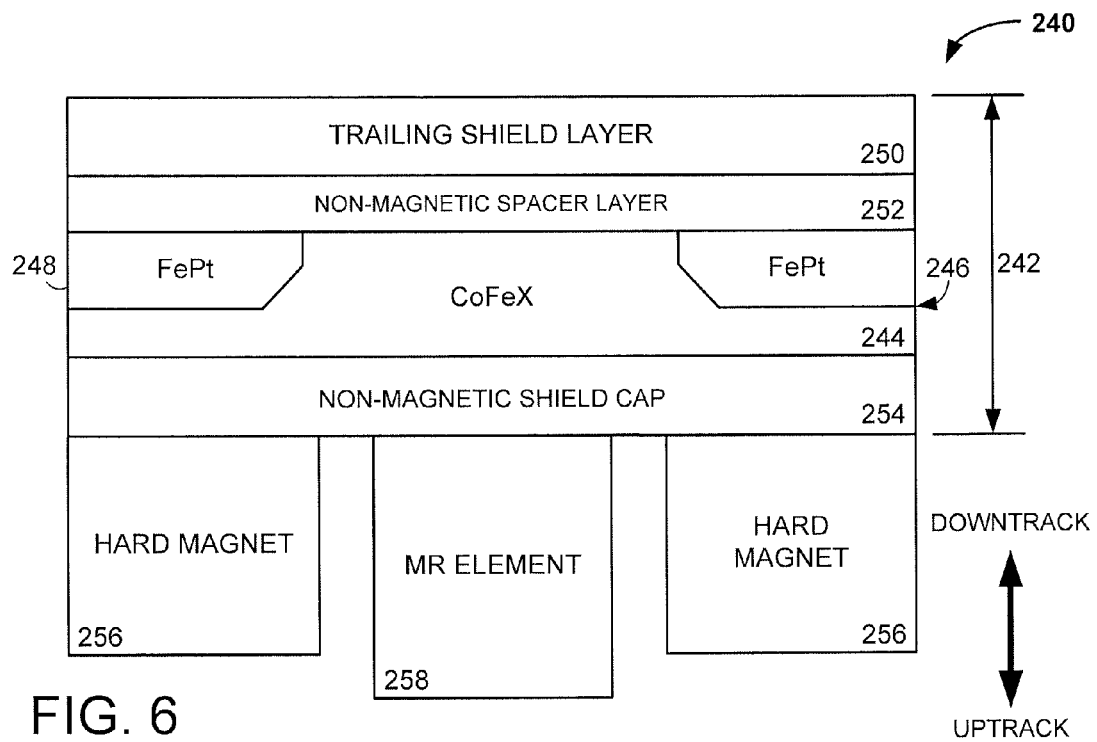
FIG. 6 displays an embodiment of a portion of a shield configuration capable of being used in the magnetic element of FIG. 3.

The notches 230 of the shielding layer 232 shown in FIG. 5 allow for the sub-magnets 228 to nest within the areal extent of the shielding layer 232, but such notches 230 are not required to be configured as shown in FIG. 5, as displayed in the magnetic element 240 of FIG. 6. The trailing shield 242 has a ferromagnetic shielding layer 244 with lateral notches 246 that have tapered internal edges that provide a greater contact surface area than the notch 230 of FIG. 5. Such notches 246 can allow the sub-magnets 248, such as FePt and CoPt, to have increased coupling and enhanced magnetic pinning of the soft ferromagnetic layer 244, which can be constructed of CoFe, CoFeB, CoFeZr, and CoFeRh in the various embodiments of the present invention.

The trailing shield 242 also is configured with varying thicknesses for the trailing shield layer 250, non-magnetic spacer layer 252, and non-magnetic shield cap 254. The shield cap 254 has a greater thickness, as measured parallel to the track, to ensure magnetic decoupling of the lateral hard magnets 256 and MR element 258. The added contact area of the notches 246 and corresponding increased magnetization of the shielding layer 244 allows for added flux protection which consequently minimizes a thick trailing shield layer 250, as shown with the thin trailing shield layer 250 compared with the same layer 238 of FIG. 5.

While the size and shape of the notches 246 can provide enhanced flux protection, the sub-magnets 248 can be further configured in predetermined physical relationships with the MR element 258 to provide a predetermined amount of magnetic pinning for the shielding layer while not affecting the magnetic sensitivity of the MR element.

Figure 7:
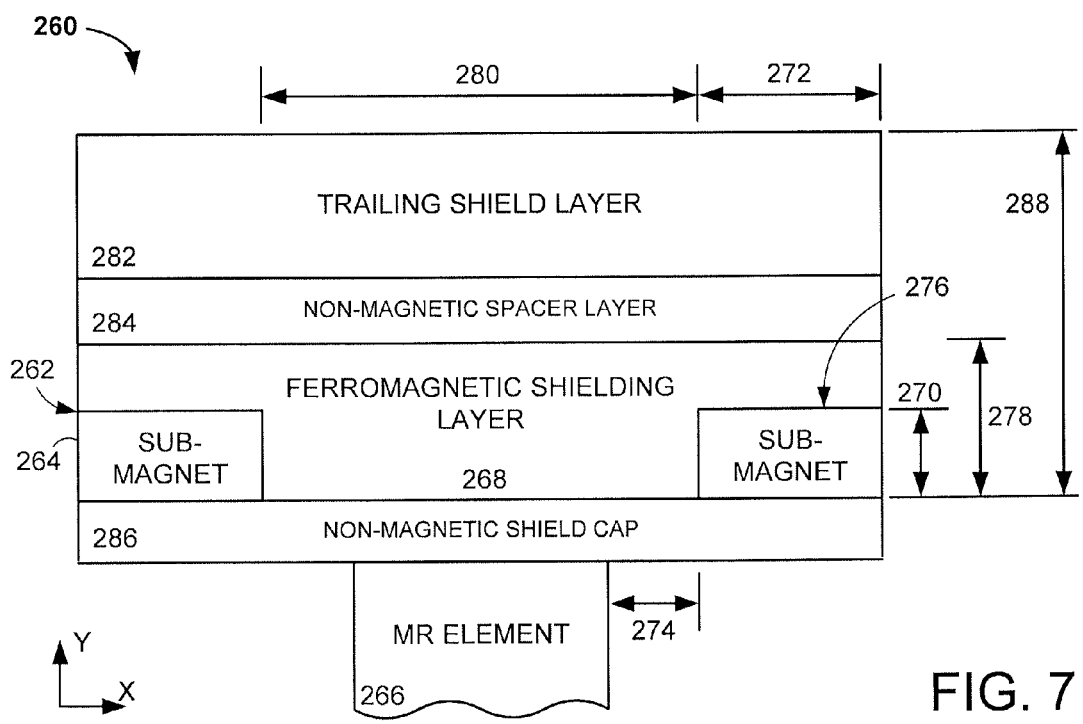
FIG. 7 shows an embodiment of a portion of a shield configuration capable of being used in the magnetic element of FIG. 3.

It can be appreciated that the sub-magnets 248 can be further configured in various ways to increase magnetic coupling with the shielding layer 244 through various size, shape, and materials. FIG. 7 shows an embodiment of a portion of a magnetic element 260 that illustrates how the notches 262 and sub-magnets 264 can be configured to provide enhanced flux protection through predetermined orientation with the MR element 266.

The sub-magnets 264 can be constructed in predetermined physical relationships with the MR element 266 to provide a predetermined amount of magnetic pinning for the shielding layer 268 while not affecting the magnetic sensitivity of the MR element 266. The notches 262 and sub-magnets 264 can be configured with a predetermined thickness 270 and lateral extent 272 that is a selected lateral distance 274 from the MR element 266 to provide a predetermined contact surface area 276 between the sub-magnet 264 and the shielding layer 268 along two normal planes (X and Y planes).

While the notches 262 and sub-magnets 264 can be configured in any orientation, some embodiments have the thickness of the notches 262 to be less than the thickness 278 of the shielding layer 268. The reduced thickness 270 of the notch 262 allows the shielding layer 268 to partially surround and contact the sub-magnet 264 with a greater area along normal planes. Without contact along multiple different planes, the sub-magnets 264 may be wider to the produce the similar magnetic pinning of the shielding layer 268, which may become too close to the MR element 266 and induce unwanted reading instability. Thus, the thickness 270 of the notches 262 and sub-magnets 264 provide ample magnetic coupling for the shielding layer 268 while maintaining a predetermined lateral distance from the MR element 266.

The sub-magnets 264 and notches 262 can also be positioned with an intervening predetermined lateral distance 280 from each other. That is, a selected distance 280 is void of sub-magnets 264 and filled with the shielding layer 268. The predetermined thickness 270 of the notch 262 can further be selected in relation to the thicknesses of the trailing shield layer 282, spacer layer 284, and shield cap 286 so that a predetermined amount of decoupling and overall shielding is provided by the trailing shield 288, as a whole.

Figure 8:
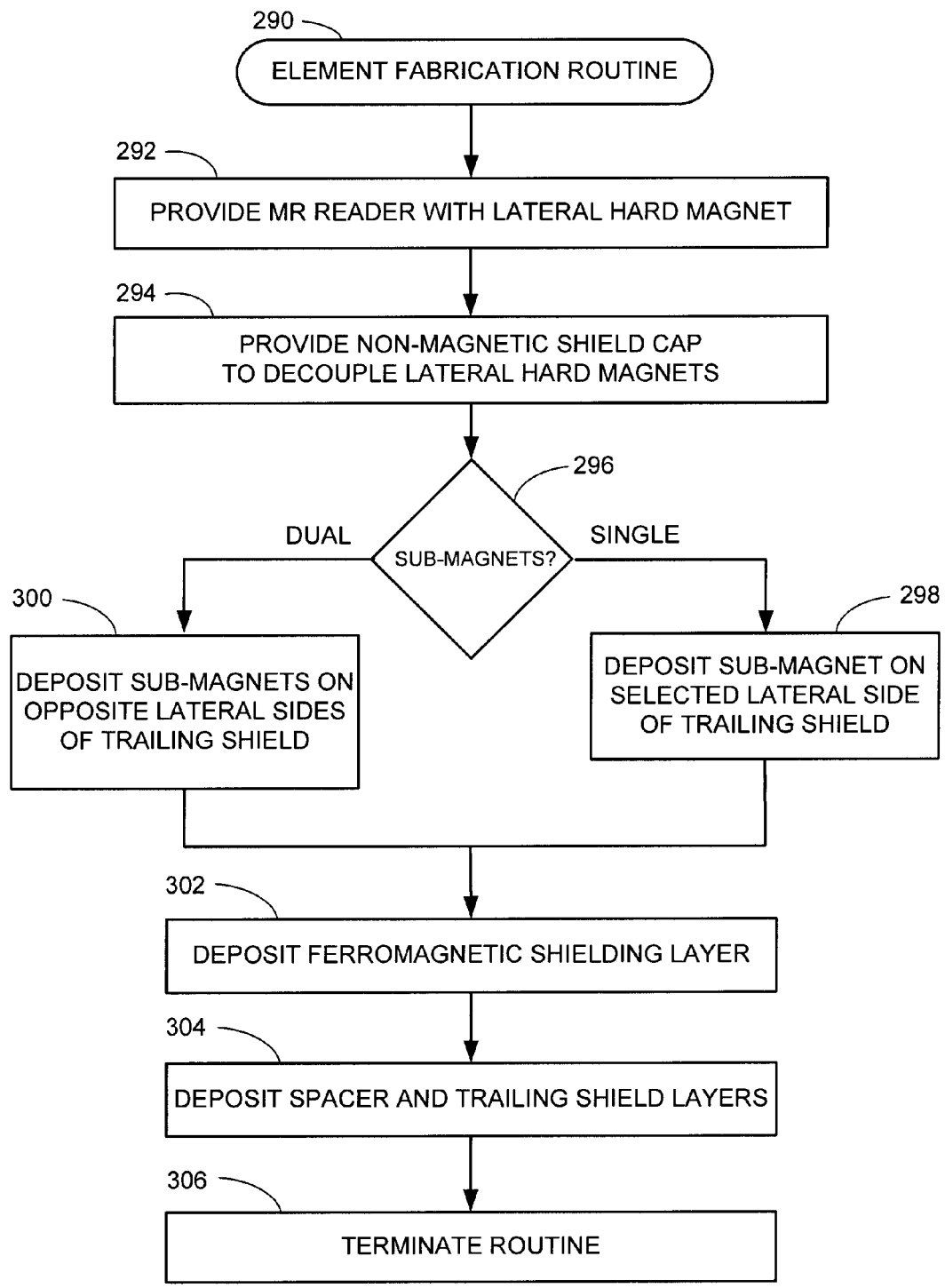
FIG. 8 provides a flowchart mapping an element fabrication routine conducted in accordance with various embodiments of the present invention.

FIG. 8 provides an embodiment of a element fabrication routine 290 conducted in accordance with various embodiments of the present invention. The routine 290 begins by providing an MR element with lateral hard magnet in step 292 that is capable of reading magnetic bits on an adjacent storage media across an ABS. A non-magnetic shield cap is then provided in step 294 to decouple the lateral hard magnets from the MR element and the trailing shield. Decision 296 then evaluates how many sub-magnets are chosen for the trailing shield. A determination of a single sub-magnet in decision 296 proceeds to step 298 where a sub-magnet is deposited on a selected lateral side of the shield cap with a predetermined thickness and lateral distance.

A determination in decision 296 of dual sub-magnets advances to step 300 where sub-magnets are deposited on opposite lateral sides of the shield cap, each with the predetermined thickness and lateral distance. No matter the number of sub-magnets, in step 302 a ferromagnetic shielding layer is deposited so that it contacts the sub-magnet(s) along normal planes and is thereby magnetically pinned to a selected magnetization. Step 304 then deposits a non-magnetic spacer layer and trailing shield layer to complete the trailing shield, which advances to step 306 where the routine 290 is terminated.

Through the routine 290, a shielding configuration is determined, installed, and ultimately terminated at step 306. However, the routine is not required or limited as the various decisions and steps can be omitted, changed, and added. For example, more than two sub-magnets can be constructed on the shield cap, with or without common thicknesses and lateral distances.

It can be appreciated that the configuration and material characteristics of the magnetic shields described in the present disclosure allows for improved magnetic reading through enhancement of the magnetic stability of the trailing shield. The sub-magnets contact with the shielding layer along two normal planes allows the magnetization of the shielding layer to be reliably pinned to improve stability of the trialing shield in the presence of errant magnetic flux. In addition, while the embodiments have been directed to magnetic sensing, it will be appreciated that the claimed invention can readily be utilized in any number of other applications, including data storage device applications.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A magnetic shield for a magnetoresistive (MR) reader comprising one or more lateral hard magnets, a ferromagnetic shielding layer with at least one hard sub-magnet in a lateral notch in the shielding layer, the notch configured to allow the shielding layer to contact the sub-magnet on surfaces along multiple normal planes.

2. The apparatus of claim 1, wherein the ferromagnetic shielding layer has a first thickness and the at least one lateral hard sub-magnet has a second thickness that is less than the first thickness to maintain the shielding layer in predetermined magnetic orientation.

3. The apparatus of claim 2, wherein the notch has a predetermined third thickness that is less than the first thickness.

4. The apparatus of claim 1, wherein the lateral notch has tapered internal surfaces.

5. The apparatus of claim 1, wherein the lateral hard magnet is constructed of a FePt alloy.

6. The apparatus of claim 1, wherein the lateral hard magnet is constructed of a CoPt alloy.

7. The apparatus of claim 1, wherein the shielding layer is constructed of CoFeX alloy.

8. The apparatus of claim 1, wherein the shielding layer is constructed of NiFeX alloy.

9. The apparatus of claim 1, wherein the notch is positioned a predetermined distance from the MR element.

10. The apparatus of claim 1, wherein the notch has a vertical and horizontal internal surface that allows the sub-magnet to couple to the shielding layer along each surface concurrently.

11. The apparatus of claim 1, wherein the notch nests the sub-magnet inside the areal extent of the shielding layer.

12. A magnetic shield for a magnetoresistive (MR) reader comprising:
    at least one lateral hard magnet with a first width;
    a ferromagnetic shielding layer with a second width and a first thickness; and
    at least one hard sub-magnet with a second thickness and third width positioned in a lateral notch in the shielding layer, the shielding layer contacting the sub-magnet on surfaces along multiple perpendicular planes.

13. The magnetic shield of claim 12, wherein the third width is less than the second and first widths.

14. The magnetic shield of claim 12, wherein the first thickness is greater than the second thickness.

15. The magnetic shield of claim 12, wherein the notch has the same dimensions as the sub-magnet.

16. The magnetic shield of claim 12, wherein the sub-magnet is magnetically isolated from the lateral hard magnet by an intervening cap shield layer.

17. A method comprising forming a magnetic shield for a magnetoresistive (MR) reader, the magnetic shield comprising one or more lateral hard magnets and a ferromagnetic shielding layer with at least one hard sub-magnet in a lateral notch in the shielding layer, the hard sub-magnet contacting multiple normal planes of the shielding layer.

18. The method of claim 17, wherein the ferromagnetic shielding layer has a first thickness and the at least one lateral hard sub-magnet has a second thickness that is less than the first thickness to maintain the shielding layer in predetermined magnetic orientation.

19. The method of claim 17, wherein each lateral hard magnet is magnetically isolated from the sub-magnet by a shield cap layer disposed therebetween.

20. The method of claim 17, wherein first and second sub-magnets of the at least one sub-magnet are each positioned at predetermined distances from the MR element and a non-magnetic spacer layer.

* * * * *